(12) United States Patent
Wang

(10) Patent No.: US 9,631,959 B1
(45) Date of Patent: Apr. 25, 2017

(54) THROTTLING BLOCK FOR FLOW METER

(71) Applicant: Skyline Flow Controls Inc., Richmond (CA)

(72) Inventor: ZiPing Wang, Vancouver (CA)

(73) Assignee: Skyline Flow Controls Inc., Richmond BC (CA)

( * ) Notice: Subject to any disclaimer, the term of this patent is extended or adjusted under 35 U.S.C. 154(b) by 7 days.

(21) Appl. No.: 14/932,164

(22) Filed: Nov. 4, 2015

(51) Int. Cl.
  *G01F 1/44* (2006.01)
  *G01F 1/40* (2006.01)
  *F15D 1/02* (2006.01)

(52) U.S. Cl.
  CPC .............. *G01F 1/40* (2013.01); *F15D 1/025* (2013.01)

(58) Field of Classification Search
  CPC ..... G01F 1/34; G01F 1/44; G01F 1/42; G01F 1/22
  USPC .............. 73/861.42, 861.64, 861.61, 861.58, 73/861.63
  See application file for complete search history.

(56) References Cited

U.S. PATENT DOCUMENTS

| | | | | |
|---|---|---|---|---|
| 3,273,390 A | * | 9/1966 | Brown | G01F 1/44 73/861.64 |
| 3,636,765 A | * | 1/1972 | Brown | G01F 1/44 73/861.64 |
| 3,918,305 A | * | 11/1975 | Benedict | G01F 1/42 73/861.61 |
| 8,833,384 B2 | * | 9/2014 | Burt | F24F 11/008 137/487.5 |
| 2011/0259119 A1 | * | 10/2011 | Steven | G01F 1/363 73/861.42 |
| 2016/0238423 A1 | * | 8/2016 | Steven | G01F 1/74 |
| 2016/0298777 A1 | * | 10/2016 | Huseyin | F02M 37/0029 |

OTHER PUBLICATIONS

Skyline Flow Controls Inc. "Skyline Flow Controls—Rectangular Meter" Oct. 1, 2014. Richmond, British Columbia, Canada.

* cited by examiner

*Primary Examiner* — Jewel V Thompson

(57) ABSTRACT

A dam-shaped throttling block for use in a pipe, for the measurement of the flow rates of fluids. The shapes of four successive flat surfaces on the throttling block angularly-displaced relative one another in the flow direction, together with an aperture in the one of the flat surfaces extending parallel to the pipe longitudinal axis, create reduction of a cross-sectional area in one step from one that is unthrottled to one that is throttled, extending for a limited distance in the pipe, and then expansion of the cross-sectional area in two steps from the throttled one back to the unthrottled one so to provide for accurate measurements and an improved lifetime. Flow rates of highly viscous fluids and fluids that contain solid particles can be measured. Other benefits include reduced head loss, wide measurement range and reduced installation space.

18 Claims, 3 Drawing Sheets

THROTTLING BLOCK FOR FLOW METER

TECHNICAL FIELD

This application relates to throttling elements. More specifically, it relates to throttling blocks in pipes, which create a measurable pressure drop for determining the flow rate of fluids within the pipe.

BACKGROUND

A portion of a prior art flow meter 10 can be seen in FIG. 1, in which a pipe 12 is fitted with a wedge-shaped throttling element 14. The wedge element 14 has flat faces 16, 18 that are angled towards each other and terminate at a straight edge 20. The angle between the faces 16, 18 may be 90°, for example. Below the edge 20 there is a gap 22. Fluid flows into the pipe 12 at end 30, for example, passes through the gap 22 below the wedge 14, and out through the other end 32 of the pipe. The wedge 14 creates a pressure drop in the fluid within the pipe 12, which can be measured by calculating the difference between the upstream pressure measured at upstream port or pressure tap 34 and the downstream pressure measured at downstream port or pressure tap 36. The flow rate can then be calculated based on the pressure drop, properties of the fluid and the size (diameter) of the pipe.

Wedge-shaped throttling elements are used to measure the flow rates of viscous fluids and slurries or other solid-laden fluids, and are often used in the chemical industry. Compared to a throttling orifice, which is typically round with a diameter smaller than the pipe diameter, the wedge has better resistance to abrasion and a longer operating life.

In order to maintain accuracy of measurement, the edge 20 of the wedge 14 should not deteriorate with use. However, especially if the flow rates of abrasive fluids are being measured, then the edge 20 can wear quickly. This causes the gap 22 to open up after a short time of operation, changing the state of flow and worsening the accuracy and repeatability of measurement. Regarding the state of the flow, when the fluid passes through the gap 22, the cross-section of the flow rapidly decreases and the static pressure falls. Downstream of the wedge, pressure is recovered and a high speed swirling stream with bubbles may be generated. The resulting whirlpool washes against the edge 20 of the wedge 14 with an erosive effect, causing serious wear to the edge. Also, wear to the pipe wall just beyond the wedge occurs. Wear to the edge 20 eventually occurs even if the edge is hardened with stellite or tungsten carbide cladding. The accuracy of a wedge-type flow meter, if used for black water containing pulverized coal for example, may fall from about 0.5% to 5% within 2-3 months. In these cases, the wedge must be replaced regularly. In practice, it is not always convenient to replace the wedge, and in many cases the wedge is used until the meter itself is damaged or the accuracy has become extremely poor. The same problems apply to orifice throttles.

Venturi tubes are also used to measure flow rates, and consist of a gradually narrowing frustoconical section of pipe, followed by a short straight section and then a frustoconical section that opens up to the original diameter. While they generally have low head losses, they are only useful for very high Reynolds numbers, i.e. for fluids that have very low viscosity and that are clean, i.e. not laden with solids.

Referring to prior art FIG. 2, which shows a pipe 40 with an indented wall 42 that forms the wedge throttle, flow enters the pipe at end 44, in the direction of arrow 46, and then leaves at end 48. Flow of the fluid speeds up in the gap 50, causing turbulence 52 and erosion 54 of the wall of the pipe. As a consequence of the fluid impinging on the bottom of the pipe wall past the edge of the wedge 42, the fluid is reflected or directed upwards to the ceiling of the pipe wall to cause further erosion 56. Even if interior surfaces of the pipe 40 are coated with tungsten carbide at the locations of erosion, the coating wears off within several months of operation, and the pipe itself may become beyond repair in less than a year.

Furthermore, when wedge-type throttling elements are used for the flow of viscous fluids, the edge may become coked or fouled with dirt, which also reduces the accuracy of the measurement. Another problem with the wedge is that it has a relatively high head loss, corresponding to the unrecoverable energy loss from throttling back the fluid flow. Typically, the head loss of wedge-type meters is 30-50% of the measured differential pressure.

In order to ensure accurate measurements using the wedge-type meter, a straight section of pipe is needed upstream of the wedge, equal to at least 10× the diameter of the pipe. Likewise, a straight length that is at least 5× the pipe diameter is needed downstream of the wedge. These requirements may limit the applications in which the wedge meter may be installed.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a dam-shaped throttling block in a pipe, for the measurement of the flow rates of fluids in the pipe. In particular, the flow rates that can be measured include those of highly viscous fluids and fluids that contain solid particles. Benefits of the invention include one or more of improved measurement accuracy, reduced head loss, wide measurement range, prolonged service life, and reduced installation space.

Disclosed herein is a throttling block for a flow meter comprising: a first flat surface, which is inclined relative to a longitudinal axis of a pipe so as to reduce a cross-sectional area available for flow in the pipe from an unthrottled cross-sectional area to a throttled cross-sectional area; a second flat surface adjoining the first flat surface and extending parallel to the longitudinal axis, so as to maintain the throttled cross-sectional area substantially constant; an aperture in the second flat surface, wherein the aperture is shorter in a direction parallel to the longitudinal axis than in a direction perpendicular to the axis; and a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area.

The throttling block may further comprise a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area.

Also disclosed herein is an assembly for a flow meter comprising: a straight section of pipe; a connector at each end of the pipe; a first pressure tap in the pipe; and a throttling block in the pipe and downstream of the first pressure tap. The throttling block comprises: a first flat surface, which is inclined relative to a longitudinal axis of the pipe so as to reduce a cross-sectional area available for flow in the pipe from an unthrottled cross-sectional area to a throttled cross-sectional area; a second flat surface adjoining the first flat surface and extending parallel to the longitudinal axis, so as to maintain the throttled cross-sectional area substantially constant; a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area; and a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area. Also included is an aperture in the second flat surface, wherein the aperture provides fluid communication between an interior of the pipe and a cavity within the throttling block, and the aperture is shorter in a direction parallel to the longitudinal axis than in a direction perpendicular to the longitudinal axis; and a second pressure tap in fluid communication with the cavity.

Embodiments of the assembly are disclosed wherein: the aperture is elliptical; a distance of a center of the aperture from the first flat surface is 65-75% of a length of the second flat surface in a direction parallel to the longitudinal axis; the cavity has an elliptical cross-section proximal to the aperture, a circular cross-section distal from the aperture, and a longitudinal axis that is perpendicular to the longitudinal axis of the pipe; the first flat surface is inclined at an angle in a range of 50° to 60° from the longitudinal axis of the pipe; the third flat surface is inclined at an angle in a range of 10° to 20° from the longitudinal axis of the pipe; the fourth flat surface is perpendicular to the longitudinal axis of the pipe, and, measured in a direction of said flow, a length of the third flat surface is 1 to 3 times greater than a length of the second flat surface.

Still further disclosed herein is a piping assembly comprising a first pressure tap and a throttling block in a pipe downstream of the first pressure tap comprising: a first flat surface, which is inclined relative to a longitudinal axis of the pipe so as to reduce a cross-sectional area available for flow in the pipe from an unthrottled cross-sectional area to a throttled cross-sectional area; a second flat surface adjoining the first flat surface and extending parallel to the longitudinal axis, so as to maintain the throttled cross-sectional area substantially constant; a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area; and a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area. Also comprised is an aperture in the second flat surface, wherein the aperture provides fluid communication between an interior of the pipe and a cavity within the throttling block, and the aperture is shorter in a direction parallel to the longitudinal axis than in a direction perpendicular to the longitudinal axis; a second pressure tap in fluid communication with the cavity; and a straight run of piping upstream of the throttling block with a length of less than 5 times an interior diameter of the pipe.

BRIEF DESCRIPTION OF DRAWINGS

The following drawings illustrate embodiments of the invention, which should not be construed as restricting the scope of the invention in any way.

DESCRIPTION

A. Glossary

Head loss—In general, this is loss of pressure in fluid that is being pumped through a pipe, due to resistance caused by the pipe walls, the viscosity of the fluid and the geometry of the pipes. Herein, it refers specifically to the unrecoverable loss in pressure due to a throttling block, which cannot be recovered downstream of the block.

Reynolds number—a ratio of inertial forces divided by viscous forces for a fluid flowing in a particular geometry. For example, for fluid in a pipe, the Reynolds number is given by $Re=QD_H/vA$, where Q is the volumetric flow rate, $D_H$ is the hydraulic diameter, v is the kinematic viscosity and A is the cross-sectional area of the pipe. Laminar flow occurs at low Re, when viscous forces are dominant, and turbulent flow occurs at high Re, when inertial forces are dominant.

B. Exemplary Embodiment

Figure 3:
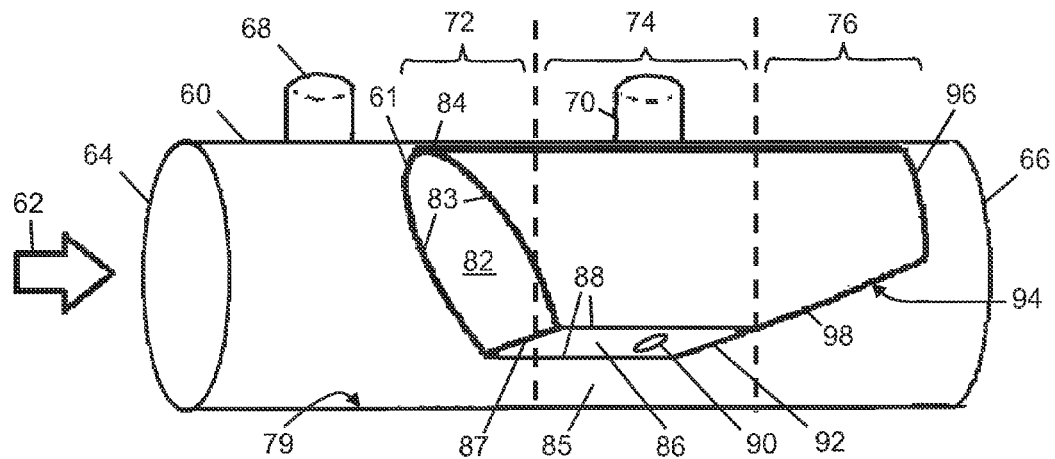
FIG. 3 is a perspective schematic view of a pipe with a dam-shaped throttling block installed in the pipe, according to an embodiment of the present invention.

Referring to FIG. 3, a pipe 60 is shown installed with an exemplary embodiment of a throttling block 61. Direction of fluid flow is given by arrow 62, the fluid flowing in through end 64 and exiting through end 66. Pressure tap 68 is for measuring the higher pressure of the fluid upstream of the throttling block 61, and pressure tap 70 is for measuring the lower pressure of the fluid as a result of its passing below the throttling block.

The throttling block 61 has three main sections: the throttling section 72; the throat or rectifying section 74; and the pressure recovery section 76.

The throttling section 72 is formed by a leading flat surface 82, angled downwards in the direction of the fluid flow 62, in conjunction with the lower inner wall surface 79 of the pipe 60. The leading surface 82 extends to the inner pipe walls at its sides 83 and its top 84, but not below, where there is a gap 85. The leading surface 82 extends downwards to meet a flat, horizontal lower surface 86 at edge 87, below which is the gap 85 for restricted fluid flow. As the leading surface 82 and lower surface 86 are both flat, the edge 87 is straight, and it is perpendicular to the axis of the pipe. The flat surface 82 is inclined relative to a longitudinal axis of the pipe so as to reduce the cross-sectional area available for flow in the pipe from an unthrottled cross-sectional area to a throttled cross-sectional area.

The side edges 88 of the lower surface adjoin the sides of the inner pipe wall. The lower surface 86, in conjunction with the lower inner wall surface 79 of the pipe 60, form the rectifying or throat section 74. The lower surface 86 is horizontal and extends parallel to the longitudinal axis of the pipe so as to maintain the throttled cross-sectional area substantially constant. An aperture 90 in the lower surface 86 provides fluid communication between the interior of the pipe and the low pressure tap 70. The effect of the aperture on the throttled cross-sectional area is assumed to be negligible, hence the throttled cross-section remains substantially constant over the length of the throat 74.

The lower surface 86 terminates rearward at edge 92, which is the leading edge of trailing flat surface 94, which, in conjunction with the lower pipe wall surface 79, forms the pressure recovery section 76. The trailing surface 94 is a truncated wedge, being truncated by rear surface 96, which is perpendicular to the main direction of flow 62. The sides 98 of the trailing surface 94 adjoin the sides of the inner pipe wall. The trailing surface 94 is inclined relative to the axis of the pipe 60 so as to increase the cross-sectional area available for flow in the pipe from the throttled cross-sectional area to a cross-sectional area that is still partially throttled, i.e. less than the unthrottled cross-sectional area.

The rear surface 96 is inclined relative to the trailing surface 94 so as to increase the cross-sectional area available for flow in the pipe, from the partially throttled cross-sectional area, to the fully unthrottled cross-sectional area.

Figure 4A:
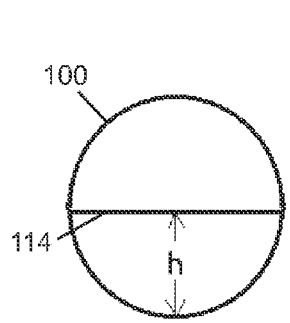
FIGS. 4A and 4B respectively are an end view and a cross-sectional schematic diagram of a dam-shaped throttling block according to an embodiment of the present invention.
Figure 4B:
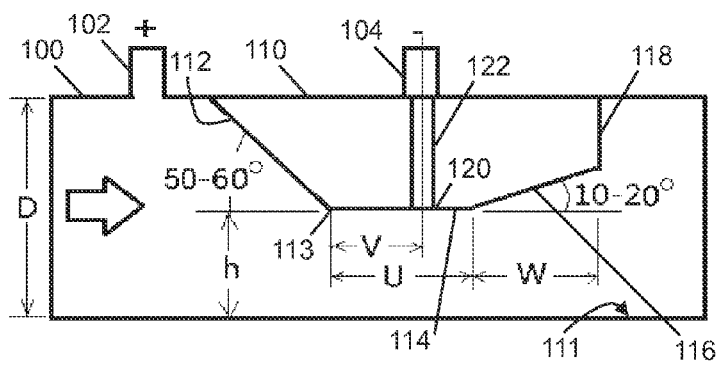

FIGS. 4A and 4B respectively show an end view and a cross-section of a pipe 100 with a throttling block 110, with various dimensions marked. The pipe 100 has upstream pressure measuring tap 102 and throat section measuring tap 104. In conjunction with the lower inner wall surface 111 of the pipe, the leading surface 112 forms the throttle section, the lower surface 114 forms the throat section and the trailing edge 116 forms the pressure recovery section. The pressure recovery section 116 is truncated at rear surface 118.

In this embodiment, the maximum height h of the gap is 0.2 to 0.6 times the internal diameter D of the pipe. The throat length U is between 0.5 h and D according to the pipe diameter D and the gap height h, which has been found to be the optimum range for rectification of the flow state from laminar to turbulent flow. In the case where the gap h is 0.5D and the throat length is D, the surface 114 is a square. In other more general cases, the surface 114 is a rectangle. The flat, leading surface 112 dips at an angle of inclination from the horizontal of between about 50° and 60°, which has been found to be best for accuracy of measurement for a wide range of different applications. The angle of the flat, trailing surface 116 to the horizontal is in a range from about 10° to about 20°. Angles within this range have been found to provide the best head loss recovery and to minimize abrasion to the pipe 100. The distance V, of the center of the aperture 120 of the pressure tap 104, from the leading edge 113 of the lower surface 114 is about 65-75% of the length U of the lower surface in the flow direction. This results in a stable throat pressure and desired accuracy of pressure measurement, by allowing more time in the throat section for the fluid flow to become steadier, or more laminar, or with fewer and smaller turbulent fluctuations. The longitudinal axis of the cavity 122 through the throttling block 110 from the aperture 120 to the throat section measuring tap 104 is perpendicular to the longitudinal axis of the pipe 100.

The length W of the pressure recovery section is about 1-3 times the length U of the throat section. Compared to wedge-type throttling blocks, the horizontal, flat, lower surface 114 of the throat section produces a much more laminar flow, and the incidence of turbulence downstream is as a consequence much lower. The truncation, at rear surface 118, of the trailing surface 116 of the pressure recovery section contributes negligibly to the production of eddies as the fluid is passing over the throttling block 110. Also, the truncation does not have any significant effect on the accuracy of the pressure measurement. Furthermore, based on tests with fluids containing pulverized coal, very little abrasion of the interior of the pipe 100 occurs downstream of the throttling block 110. Another advantage of truncating the trailing surface 116 is that the throttling block 110 can be shorter than if the trailing surface were not truncated.

Figure 5:
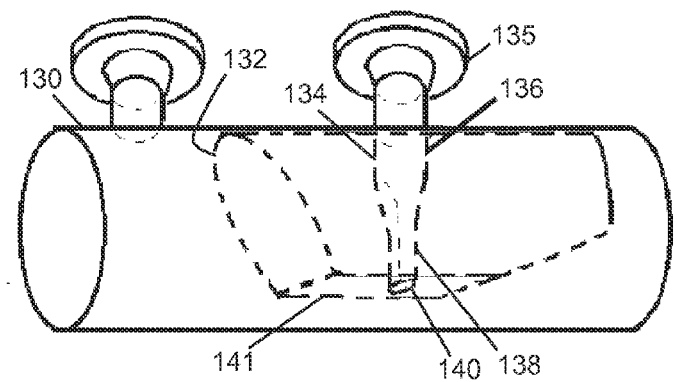
FIG. 5 shows in hidden detail a view of a dam-shaped throttling block with a low-pressure tap, installed in a pipe, according to an embodiment of the present invention.
Figure 6:
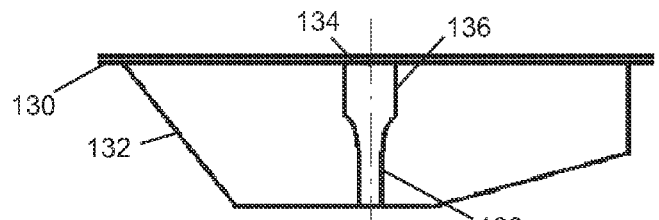
FIG. 6 shows a cross-sectional view of dam-shaped throttling block and pressure-tap cavity, according to an embodiment of the present invention.

Referring to the embodiment in FIG. 5, pipe 130 is shown with throttling block 132. The cavity 134 of the pressure measuring tap 135 through the block 132 to the aperture 140 has an upper, hollow section 136 that is circular in cross-section, and a lower, hollow portion 138 that is elliptical in cross-section. The view in FIG. 6 shows the upper cylindrical portion 136 and the lower elliptical portion 138 of the cavity 134 in the throttling block 132 more clearly. Referring back to FIG. 5, the aperture 140 of the tap 134 in the lower surface 141, through which the interior of the tap is in fluid communication with the interior of the pipe 130, is also elliptical.

Figure 7:
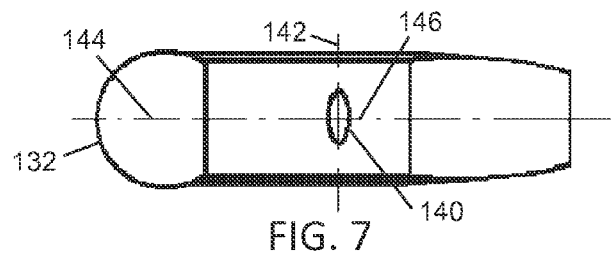
FIG. 7 shows a view of the underside of the throttling block according to an embodiment of the present invention.

As shown in FIG. 7, the aperture 140 in the throttling block 132 is aligned with its long axis 142 perpendicular to the longitudinal axis 144 of the pipe and direction of flow through the pipe. The short axis 146 of the aperture 140 is oriented parallel to the longitudinal axis 144 of the pipe and the direction of fluid flow through the pipe. The elliptical shape of the aperture 140 reduces the ingress of solids and possible blocking compared to a circular aperture of the same area, while providing adequate area for transferring pressure to a pressure sensor. Also, the dimension of the elliptical aperture 140 in the flow direction is smaller than that of an equivalent circular aperture, resulting in a smaller disturbance to the flow of fluid through the throat section. Furthermore, the positioning of the aperture 140 downstream of the center of the lower surface allows more time for the fluid flow to stabilize, leading to increased pressure measurement accuracy. If the aperture were oriented a right angles to the position shown, then the accuracy of measurement would drop.

Figure 8:
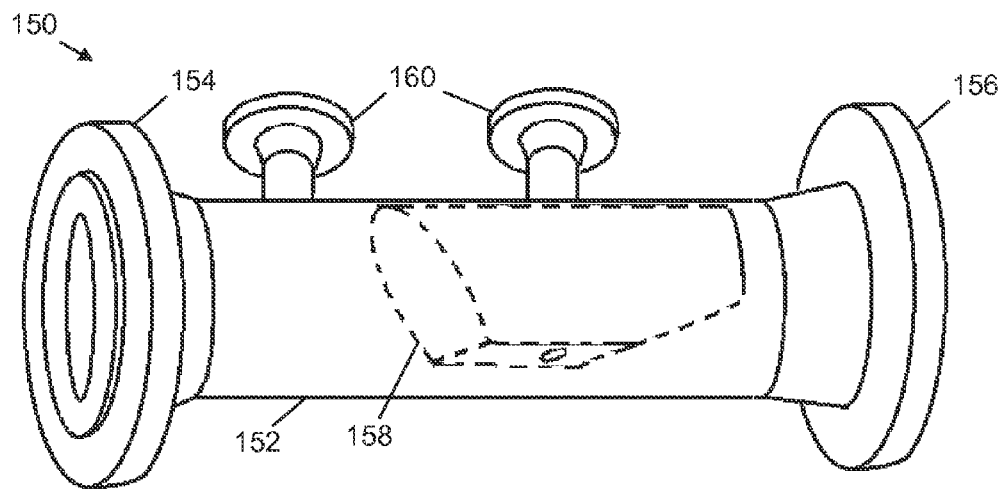
FIG. 8 is a perspective view of an assembly of a pipe fitted with flanges and a dam-shaped throttling block according to an embodiment of the present invention.

FIG. 8 shows a throttling block pipe assembly 150 that includes a pipe 152 fitted with end flanges 154, 156 and throttling block 158. Such an assembly can be readily fitted to pipe work, and removed and replaced when required. As an example, the overall length of the assembly may be about 1.3 m; the inner diameter of the pipe 152 about 23 cm; and the length of the throttling block 158 may be about 40 cm. Pressure tap flanges 160 and pipe end flanges 154, 156 may be standard or custom sizes depending on the embodiment.

Figure 9:
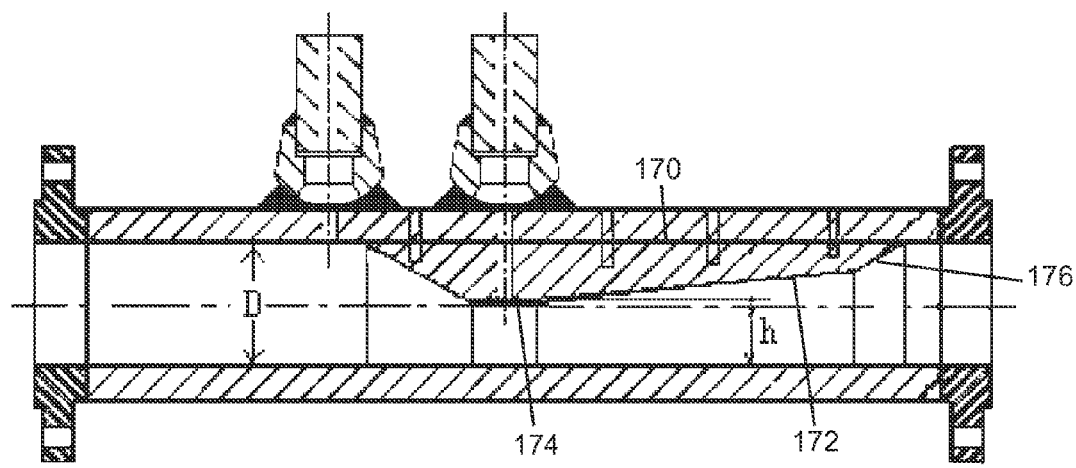
FIG. 9 is a cross-sectional view of an alternate dam-shaped throttling block according to an embodiment of the present invention.

While the best presently contemplated mode of implementing the invention has been described above, FIG. 9 shows an alternate embodiment in which the throttling block 170 has a trailing surface 172, which is about five times the length of the lower surface 174. Also, the wedge formed by the trailing surface 172 is truncated with a rear wall 176 that is inclined relative to the pipe's axis rather than a wall that is perpendicular to the axis. In this example, the height h of the gap that forms the throat section is about half the diameter D of the bore of the pipe.

The presently disclosed, dam-shaped throttling block makes up for the disadvantages of wedge-type and Venturi meters, while retaining the advantages of each. The invention can be used for measuring the flow rates of gas, steam and liquids, including slurries and oil and other high viscosity liquids, erosive fluids and highly-abrasive gases and liquids which contain solid particles. Example Reynolds numbers of flowing fluids that can be measured with the dam-type flow meter are, for clean fluids (i.e. without solid particles), 6000 or higher, and for viscous fluids, 500 or more. When a fluid passes over the throttling block, the velocity of flow increases, the kinetic energy of the fluid increases, and the pressure of the fluid decreases. This decrease in pressure is proportional to the square of the speed of flow, therefore the flow rate can be calculated by measuring the pressure drop. Depending on the type of fluid and the embodiment, the range of flows that can be measured with a single installation of the invention can vary by a factor of 1 to 10 or even 1 to 100.

Figure 1:
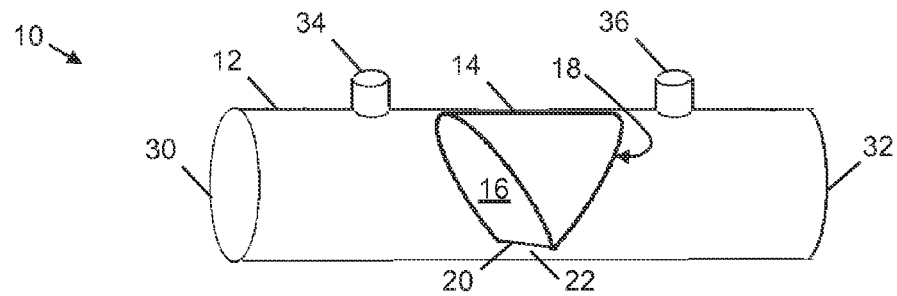
FIG. 1 is a perspective schematic view of a pipe with a prior art wedge-type throttling block installed in the pipe.

The generally lower, or more steady, turbulence, which results from using the dam-shaped throttling block, extends the life of the flow meters using the blocks due to the reduced abrasion of the throttling block and the inner walls of the pipe. In tests performed by the inventor, it has been found that the dam-type throttling block can last about five times longer than the wedge-type throttling block. This is in part due to the absence of sharp edges, as in the wedge-type throttling block, such as edge 20 (FIG. 1). The overall envelope of the dam-shaped throttling block is convex, which is less disruptive to flow in the pipe. The dam-shaped throttling block causes a relatively low head loss in the range of 10-25% of the measured pressure differential.

Depending on the embodiment, a measurement accuracy of 0.5% can be obtained at the point of manufacture. Further calibration of the flow meters that use the dam-shaped throttling blocks can improve the accuracy to 0.25% or even better.

It is usual, when installing a flow meter, to ensure that there are straight lengths of pipe both before and after the flow meter. For example, for best accuracy, a wedge-type meter generally requires about a 10D (diameter) straight length upstream of the meter and a 5D straight pipe run downstream of the throttling block, although in some cases 5D upstream and 3D downstream may be tolerable. In contrast, the dam-type meter requires a straight pipe run of only 2D-5D upstream of the throttling block, without any requirement for a straight pipe run downstream of the block. The actual length of the straight pipe run depends on the flow disturbing feature immediately upstream of the straight run. For example, the disturbing feature may be an elbow, a reducer, an increaser or a gate valve. As a result, the installation space required for a dam-type flow meter is relatively low. Table 1 shows the straight pipe runs required upstream of the dam-shaped throttling block. Lengths of the runs are given in units of pipe diameter. Preferred lengths are given first, with minimum lengths given in brackets. The equivalent diameter ratio is the square root of the cross-sectional area of the gap 85 (FIG. 3) divided by the square root of the internal cross-sectional area of the pipe 64.

TABLE 1

| Equivalent diameter ratio $\beta = d/D$ | Single 90° short radius elbow | One or more 90° elbows in the same plane | Divergent pipe from 0.75 D to D, within a length D | Fully opened ball or gate valve |
|---|---|---|---|---|
| 0.30 | 0.5 | 1.5 (0.5) | 1.5 (0.5) | 1.5 (0.5) |
| 0.35 | 0.5 | 1.5 (0.5) | 1.5 (0.5) | 2.5 (0.5) |
| 0.40 | 0.5 | 1.5 (0.5) | 1.5 (0.5) | 2.5 (1.5) |
| 0.45 | 1.0 (0.5) | 1.5 (0.5) | 2.5 (1.0) | 3.5 (1.5) |
| 0.50 | 1.5 (0.5) | 2.5 (1.5) | 2.5 (1.5) | 3.5 (1.5) |
| 0.55 | 2.5 (0.5) | 2.5 (1.5) | 3.5 (1.5) | 4.5 (2.5) |
| 0.60 | 3.0 (1.0) | 3.5 (2.5) | 3.5 (1.5) | 4.5 (2.5) |
| 0.65 | 4.0 (1.5) | 4.5 (2.5) | 4.5 (2.5) | 4.5 (2.5) |

An example application of the invention is the use of the dam-shaped throttling block in a coal gasification process, where it is important to accurately measure the flow rates of the black water (intermediate reaction products containing pulverized coal) and gray water (washing water containing pulverized coal). Use of the present invention instead of wedge-type flow meters has been shown to reduce blockages and to reduce wear, as well as to provide extended, stable and accurate performance.

C. Variations

The embodiments described are the result, at least in part, of considerable experimental effort and include the best presently contemplated mode of carrying out the subject matter disclosed and claimed herein. However, further variations and embodiments are possible.

It is possible to harden the leading surface of the throttling block, as well as the lower surface and trailing surface, which can reduce wear further. For example, tungsten carbide may be used for the hardening, or and HVOF (high velocity oxygen fuel) coating. Coating may also be applied to the regions of the interior of the pipe in the vicinity of the throttling block.

Instead of flanges for connecting to the other pipework, threaded connectors, butt welds or socket welds may be used.

The leading edge 87 of the lower surface 86 may be radiused.

To date, dimensions of the dam-shaped throttling block have been tested for pipe diameters of 2" to 24", with pressure ratings from Class 150 to Class 2500 LB, and operating temperatures from −180° C. to 650° C.

Materials that can be used for the throttling block include carbon steel, stainless steel, monel, Hastelloy™, zirconium and dual-phase steel.

Figure 2:
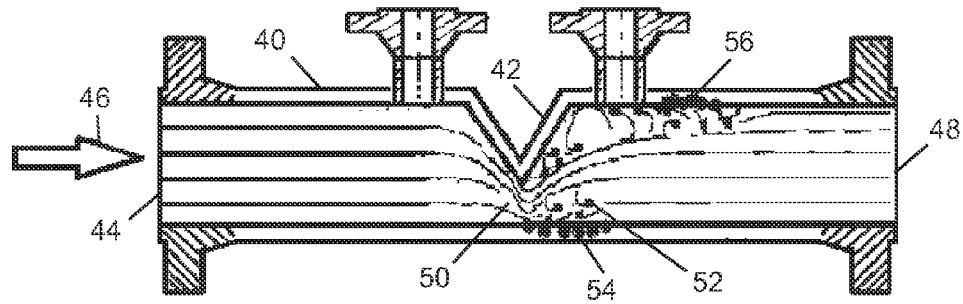
FIG. 2 is a cross-sectional view of a prior art wedge-type throttle formed in a wall of a pipe, showing locations of erosion.

The dam-shaped throttling block may be formed by cutting into and inserting plates into the side wall of the pipe, for example as shown for the wedge-type throttling block of FIG. 2.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

It will be clear to one having skill in the art that variations to the specific details disclosed herein can be made, resulting in other embodiments that are within the scope of the invention disclosed. All parameters, dimensions, materials, and configurations described herein are examples only and actual values of such depend on the specific embodiment. Accordingly, the scope of the invention is to be construed in accordance with the substance defined by the following claims.

The invention claimed is:

1. A throttling block for a flow meter comprising:
a first flat surface, which is inclined relative to a longitudinal axis of a pipe so as to reduce a cross-sectional area available for flow in the pipe from an unthrottled cross-sectional area to a throttled cross-sectional area;
a second flat surface adjoining the first flat surface and extending parallel to the longitudinal axis, so as to maintain the throttled cross-sectional area substantially constant;
an aperture in the second flat surface, wherein the aperture is shorter in a direction parallel to the longitudinal axis than in a direction perpendicular to the longitudinal axis; and
a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area.

2. The throttling block of claim 1, further comprising:
a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area.

3. The throttling block of claim 2, wherein the fourth flat surface is perpendicular to the longitudinal axis.

4. The throttling block of claim 2, wherein the fourth flat surface is inclined relative to the longitudinal axis.

5. The throttling block of claim 2, wherein at least two of said flat surfaces are adjoined via a straight edge.

6. The throttling block of claim 2, wherein at least two of said flat surfaces are adjoined via a radiused edge.

7. The throttling block of claim 2, wherein the aperture is elliptical.

8. The throttling block of claim 7, wherein the aperture provides fluid communication with a cavity within the throttling block, said cavity having:
an elliptical cross-section proximal to the aperture;
a circular cross-section distal from the aperture; and
a longitudinal axis that is perpendicular to the longitudinal axis of the pipe.

9. The throttling block of claim 2, wherein:
the second flat surface has a length parallel to the axis; and
a distance of a center of the aperture from the first flat surface is 65-75% of said length.

10. The throttling block of claim 9, wherein the length is between:
half a maximum gap between the second flat surface and an inner surface of the pipe; and
an internal diameter of the pipe.

11. The throttling block of claim 2, wherein the first flat surface is inclined at an angle in a range of 50° to 60° from the axis.

12. The throttling block of claim 2, wherein the third flat surface is inclined at an angle in a range of 10° to 20° from the axis.

13. The throttling block of claim 2, wherein a length of the third flat surface is 1 to 5 times greater than a length of the second flat surface, said lengths measured in a direction of said flow.

14. The throttling block of claim 13, wherein the length of the third flat surface is 1 to 3 times greater than the length of the second flat surface.

15. An assembly for a flow meter comprising:
a straight section of pipe;
a connector at each end of the pipe;
a first pressure tap in the pipe;
a throttling block in the pipe and downstream of the first pressure tap, comprising:
a first flat surface, which is inclined relative to a longitudinal axis of the pipe so as to reduce a cross-sectional area available for flow in the pipe from an unthrottled cross-sectional area to a throttled cross-sectional area;
a second flat surface adjoining the first flat surface and extending parallel to the longitudinal axis, so as to maintain the throttled cross-sectional area substantially constant;
a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area; and
a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area;
and
an aperture in the second flat surface, wherein:
the aperture provides fluid communication between an interior of the pipe and a cavity within the throttling block; and
the aperture is shorter in a direction parallel to the longitudinal axis than in a direction perpendicular to the longitudinal axis; and
a second pressure tap in fluid communication with the cavity.

16. The assembly of claim 15, wherein:
the aperture is elliptical;
a distance of a center of the aperture from the first flat surface is 65-75% of a length of the second flat surface in a direction parallel to the longitudinal axis of the pipe;
the cavity has an elliptical cross-section proximal to the aperture, a circular cross-section distal from the aperture, and a longitudinal axis that is perpendicular to the longitudinal axis of the pipe;
the first flat surface is inclined at an angle in a range of 50° to 60° from the longitudinal axis of the pipe;
the second flat surface has a length that is between (a) half a maximum gap between the second flat surface and an inner surface of the pipe and (b) an internal diameter of the pipe;
the third flat surface is inclined at an angle in a range of 10° to 20° from the longitudinal axis of the pipe;
the fourth flat surface is perpendicular to the longitudinal axis of the pipe, and, measured in a direction of said flow, a length of the third flat surface is 1 to 3 times greater than the length of the second flat surface.

17. A piping assembly comprising:
   a first pressure tap;
   a throttling block in a pipe downstream of the first pressure tap comprising:
      a first flat surface, which is inclined relative to a longitudinal axis of the pipe so as to reduce a cross-sectional area available for flow in the pipe from an unthrottled cross-sectional area to a throttled cross-sectional area;
      a second flat surface adjoining the first flat surface and extending parallel to the longitudinal axis, so as to maintain the throttled cross-sectional area substantially constant;
      a third flat surface adjoining the second flat surface and inclined relative to the longitudinal axis so as to increase the cross-sectional area available for flow in the pipe from the throttled cross-sectional area to a cross-sectional area that is less than the unthrottled cross-sectional area; and
      a fourth flat surface adjoining the third flat surface and inclined relative to the third flat surface so as to increase the cross-sectional area available for flow in the pipe, from said cross-sectional area that is less than the unthrottled cross-sectional area, to the unthrottled cross-sectional area;
   an aperture in the second flat surface, wherein:
      the aperture provides fluid communication between an interior of the pipe and a cavity within the throttling block; and
      the aperture is shorter in a direction parallel to the longitudinal axis than in a direction perpendicular to the longitudinal axis;
   a second pressure tap in fluid communication with the cavity; and
   a straight run of piping upstream of the throttling block with a length of less than 5 times an interior diameter of the pipe.

18. The piping assembly of claim 17, wherein:
   the aperture is elliptical;
   a distance of a center of the aperture from the first flat surface is 65-75% of a length of the second flat surface in a direction parallel to the longitudinal axis of the pipe;
   the cavity has an elliptical cross-section proximal to the aperture, a circular cross-section distal from the aperture, and a longitudinal axis that is perpendicular to the longitudinal axis of the pipe;
   the first flat surface is inclined at an angle in a range of 50° to 60° from the longitudinal axis of the pipe;
   the second flat surface has a length that is between (a) half a maximum gap between the second flat surface and an inner surface of the pipe and (b) an internal diameter of the pipe;
   the third flat surface is inclined at an angle in a range of 10° to 20° from the longitudinal axis of the pipe;
   the fourth flat surface is perpendicular to the longitudinal axis of the pipe, and,
   measured in a direction of said flow, a length of the third flat surface is 1 to 3 times greater than the length of the second flat surface.

* * * * *